Figure 1:
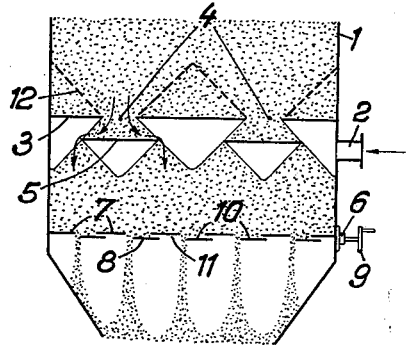

Oct. 20, 1953  E. ARNOLD ET AL  2,656,007
APPARATUS FOR THE GRAVITY CONVEYANCE OF ADSORPTION MEDIA
Filed June 16, 1950  3 Sheets-Sheet 1

Inventors
ERICH ARNOLD
EDMUND HEILMANN
WENDLIN VOLLMER
By Bailey, Stephens & Huettig
Attorneys Oct. 20, 1953　　　E. ARNOLD ET AL　　　2,656,007
APPARATUS FOR THE GRAVITY CONVEYANCE OF ADSORPTION MEDIA
Filed June 16, 1950　　　　　　　　　　　　　　3 Sheets-Sheet 2

INVENTORS
ERICH ARNOLD,
EDMOND HEILMANN,
WENDLIN VOLLMER,
BY Bailey, Stephens & Huettig
ATTORNEYS

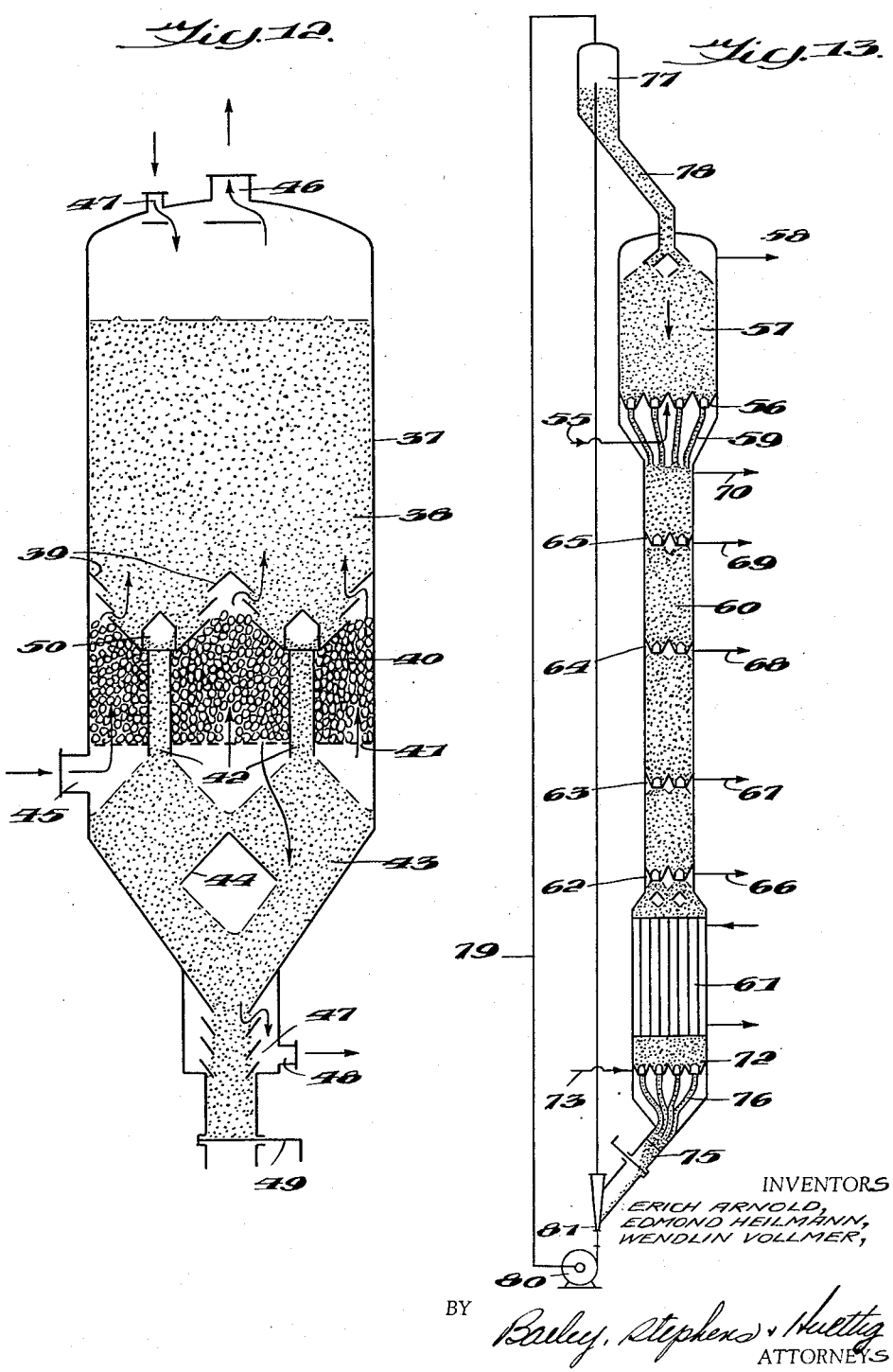

UNITED STATES PATENT OFFICE 2,656,007

APPARATUS FOR THE GRAVITY CONVEYANCE OF ADSORPTION MEDIA

Erich Arnold, Edmund Heilmann, and Wendlin Vollmer, Frankfurt am Main, Germany, assignors to Metallgesellschaft Aktiengesellschaft, Frankfurt am Main, Germany, a corporation of Germany Application June 16, 1950, Serial No. 168,464

14 Claims. (Cl. 183—4.2)

The invention relates to an apparatus for the continuous or intermittent conveyance of adsorption media, catalysts or the like material from one chamber to another lying below the latter or for the discharge of said materials. In adsorption processes there often arises the problem of passing, continuously or intermittently, granular adsorption media such as active carbons, silica gel or the like from one reaction chamber to another lying below it or of discharging the same substances from the adsorption apparatus.

It is also important, when passing adsorption media through an adsorption apparatus, that the downward motion of the adsorption media proceeds uniformly over the whole cross-section of the apparatus, so as to ensure uniform working of the media in the various zones of the apparatus which it passes in succession.

The effect of the various reactions, especially of adsorption, desorption and rectisorption (exchange of substances similar to rectification, but by adsorption and desorption), which occur when separating mixtures of materials having different boiling limits, and which consists in the displacement of the adsorbed, lighter-boiling ingredients by higher-boiling ones, especially the degree of concentration and the closeness of separation, depend to a large extent on passing the adsorption media in an even flow through the reaction chambers and on getting the separate grains of the adsorption media in contact with equal quantities of the gases to be treated. The same applies to the cooling of the adsorption media and the drying of the same which may become necessary.

Up to the present, mechanically actuated installations were employed for passing the adsorption media through the adsorption apparatus and for discharging the same from the adsorption apparatus. For example a grate with a reciprocating motion was used, which on each movement took up equal quantities of the adsorption media, and by means of which the lower layers of the adsorption media could be withdrawn periodically from the adsorption apparatus. When using such a discharge grate, mechanical abrasion and crushing of the adsorption media is unavoidable. The dust or fine grains formed by the abrasion are not suitable for further use after the regeneration or reactivation of the exhausted adsorption media. Moreover, with this known apparatus, the adsorption media and the gaseous agents to be treated must pass through the same openings in counter-flow relation. This will result in displacements of the adsorption media, and an undesirable washing-out of the same, and similar disadvantages. In addition, a successive discharge of different layers of adsorption media will not be possible by means of this apparatus, if a material serving the purpose of heat regeneration, such as fillers or the like, is arranged below the layers of the adsorption media.

Similar disadvantages occurred with continuous adsorption processes also using hitherto mechanically actuated devices for the passing through of adsorption media. These devices consisted of two superposed units of short, round or oval tubes, inserted in bottom plates of which at least one unit was given an oscillating motion, so that the adsorption medium could flow through in intermittent movements.

It is further known to use, between two reaction chambers, stationary bases with inserted downpipes. In this way, hollow spaces will form between the pipes, which serve for introducing or withdrawing the various gaseous agents used in adsorption processes, such as gases or vapors. With these devices the pressure of the column of the adsorption media could not be prevented from being transmitted through the pipes, for instance downwards, so that the pressure will increase with its downward trend. However, this pressure load interferes with the even downward flow of the adsorption agent and the regulation of the downward movement and has the result that the adsorption media are less efficient and show greater attrition.

In the case of continuous adsorption process, attempts were made to overcome these difficulties by using comparatively hard adsorption media, such as carbons produced of cocoanut-shell, plum-stones, apricot-stones and the like. In this way, the loss due to attrition or crushing was kept within bearable limits. On the other hand, this kind of hard adsorption media is unsuitable for many purposes. Particularly, these adsorption media have too great a retaining capacity for high-boiling components which proves to be disturbing when materials which are condensable under normal pressure and at normal temperature, are to be separated from gases. For this purpose, the use of an adsorption media of larger pore structure, and correspondingly lower compactness, i. e. of a comparatively low bulkweight, possibly below 450 kilograms per cubic meter, will be advantageous. However, this kind of adsorption media has a lower hardness, and when applied in the known continuous adsorption processes, are found to result in too high losses in wear, which are intolerably high especially when using a coarse-grained adsorption medium of a grain-size of more than 1.5 mm., the use of which would be desirable for the sake of saving power (lower gas resistance).

A further disadvantage was encountered with the conventional apparatus when the adsorption media and a gaseous agent were led in counter-current flow through the connections between two reaction-chambers. This disadvantage consists in the fact that the increased velocity of flow of the gaseous agent, which is due to the narrower cross-sections will unavoidably exert undesirable effects upon the adsorption media when passing the connections.

By means of the present invention, these disadvantages can be obviated. According to this invention, the adsorption media or the like, for the purpose of a continuous or intermittent transfer from one chamber into another lying below it, e. g. for the purpose of a continuous or intermittent discharge from the reaction chambers or for the purpose of a continuous or discontinuous transfer from one zone into a deeper zone, are led on to holding planes lying between the upper chamber from which the adsorption media flow out, and the lower chamber into which they are to be transferred. The transfer of the adsorption media to the holding planes is achieved by means of guide-planes or of openings provided in the bottom or the lower part of the side-wall of the reaction chamber or in insertions inserted above the holding planes, in such a way that the adsorption media will lie in heaps on the holding planes or baffles and the pressure or part of the pressure exerted by the layer of adsorption media lying above will be intercepted by the holding planes. The adsorption media will trickle down from the holding planes continuously or intermittently in proportion as room becomes available in the lower chamber by discharging of the adsorption media.

The invention ensures that the adsorption media are no longer damaged by heavy mechanical strain when being transferred from one reaction chamber into another or discharged from the adsorption apparatus. Moreover, an even passage of the adsorption media through the adsorption apparatus and its even discharge from the latter can be achieved. In addition, the entire weight or a great part of the weight of the column of adsorption media passing over the holding planes is intercepted.

According to the invention, openings may be provided at the bottom between one reacting chamber and the one lying below it, which openings may also be arranged in different planes lying at an angle to each other and to which the adsorption media may be transferred by means of inclined guiding planes, as the case may be. Below the openings, holding planes are arranged over which the adsorption media flows off laterally.

As guiding planes, parallelly or concentrically arranged roofs may be used, of which the bottom edges are suitably spaced apart, so that the adsorption media is transferred over the roof planes into gaps between the roofs. Below these openings, the holding planes are arranged which prevent the adsorption media from freely falling through the openings, permitting the same only to trickle off to the extent that natural slopes will form. An even passage of the adsorption media through the sluicing- and discharging devices is thus achieved, a hollow space being obtained below the roofs and holding planes, providing the possibility of a uniform supply and discharge of gas and vapor, by constructing the roof-like guiding planes in the form of Venetian blinds. In this way the gases and vapors may be passed through the apparatus separately from the adsorption media, preventing at the same time a disturbance of the even downward movement of the adsorption media by the gases and vapors being passed in counter-flow.

The speed at which the adsorption media passes through the adsorption apparatus may be regulated by means of a damper which may be arranged at the bottom of the adsorption apparatus above the discharge opening. This damper may consist of two planes provided with openings, at least one of which is adjustable. By changing the overlap of the openings in both planes, the quantity of adsorption media flowing through in a unit of time may be regulated. The same device can also serve for a complete shut-off of the flow of adsorption media. At the same time, a regulation of the passage of the adsorption media through all of the upper zones of the adsorption apparatus may be effected as well. Yet such or similar shut-off or regulating devices may also be arranged between two zones of the adsorption apparatus, or the openings for the passage of the adsorption media from one zone into the one lying below it may be made adjustable in a similar way, or the regulation may take place at two or more points of the adsorption apparatus.

A further method of carrying out this invention consists in providing openings also in the guiding planes which are roof-like or inclined towards one side only, through which openings the adsorption media will get to the holding planes lying underneath from which it will trickle down according to the slope angle. In this case, the openings may be of a smaller size or may even be omitted.

Alternatively, erect walls may be provided on both sides of each gap between two roof-like guiding planes. These walls have openings, permitting the adsorption media to fall through and are connected at their lower rims by plates which are arranged behind the said openings, so that the adsorption media may proceed down between the plates. In this way, the direction of flow of the adsorption media is changed when the media flows through the new device whereby an extraordinary evenness of the downward flow will be accomplished.

Moreover, connecting devices, such as tubes, hoses, channels or narrow chambers may be arranged below the passage openings for the adsorption media, through which devices the adsorption media may be led downwards through a suitable distance separately from the gases or other materials. Such devices will prove advantageous when the cross sections of the reaction chambers differ or when the pressure in two superposed reaction chambers is different. In the first case the adsorption media will be prevented from flowing downwards more quickly in the center than on the circumference. In the latter case, the column of adsorption media is kept so high in the tubes or hoses or the like that practically no gases can pass through the adsorption media from one chamber into another. Similar devices are also advantageous when adsorption media are to be periodically discharged from an adsorption apparatus in the lower part of which filling materials or similar layers are arranged.

According to a further embodiment of the invention, all or several flows are transferred from the holding and deflecting planes to one single outlet pipe. For instance, the adsorption media traveling downward is guided over two or more series of holding and deflecting planes lying one below the other, and before reaching each lower series, several partial flows are united and transferred from the last series to a central outlet pipe or a small number of outlet pipes. Alternatively, the adsorption media is, in partial flows, transferred to holding and deflecting planes lying at the circumference of the adsorption media container. From the holding and deflecting planes, it is passed into a collecting funnel ending in an outlet pipe. This method offers the advantage that even in containers with large cross sections a very uniform passage of the adsorption media through the whole apparatus is attained, notwithstanding the contraction of the adsorption media to a substantially narrower cross section, amounting to only $\frac{1}{50}$ or $\frac{1}{60}$ of the cross section of the reaction chamber. By this reduction of the cross section a good separation of the various atmospheres above and below the transfer or exit devices is achieved. Moreover a very careful treatment of the adsorption media or the like is ensured, so that attrition is substantially reduced, even in the case of less hard media.

By this invention, the application of continuous adsorption is placed on a substantially broader basis. Whereas previously substances gaseous at normal temperature could be obtained or separated successfully by continuous adsorption only, this invention not only makes possible the improvement of such recovery processes, but also the use of initial gases with higher-boiling constituents, such as hydrocarbons containing three or more carbon atoms per molecule. This is due to the fact that the user is no longer limited to the application of specially hard adsorption media, but may advantageously use also less hard adsorption media of a coarser pore structure and a smaller bulkweight or larger grain size respectively, such as formed activated carbon of the types "Supersorbon" (charcoal of grain size 2–4 mm., specific gravity 450 kilograms per cubic meter, adsorption capacity in accordance with a flat isotherm, particularly suitable for solvent recovery from pure air or gases) and "Bensorbon" (charcoal of grain size 2–4 mm., specific gravity about 300 kilograms per cubic meter, adsorption capacity in accordance with a steep isotherm, particularly suitable for the recovery of hydrocarbons such as benzene from gases which contain other impurities).

This invention will be further demonstrated by the accompanying drawing which, by way of example, diagrammatically represents various embodiments of the new device.

Figure 2:
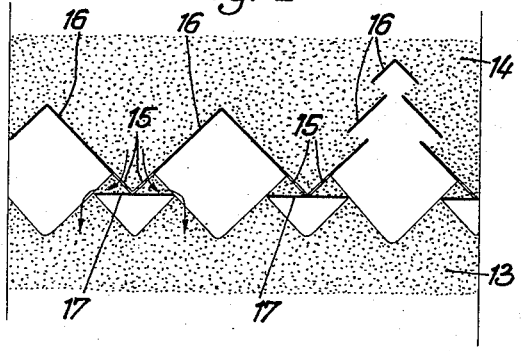
Figure 3:
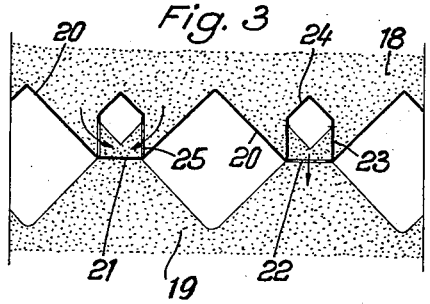
Figure 4:
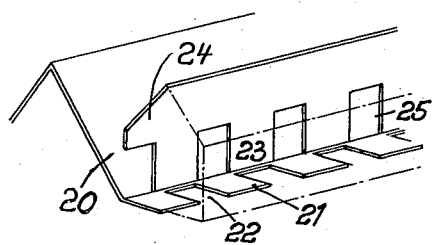
Figure 8:
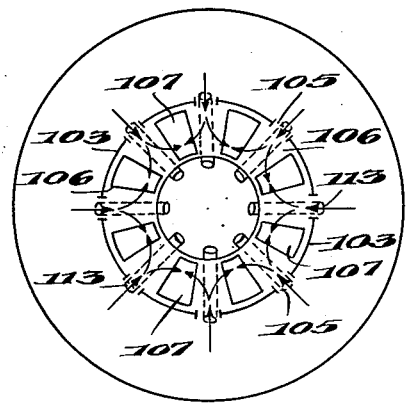
Figure 9:
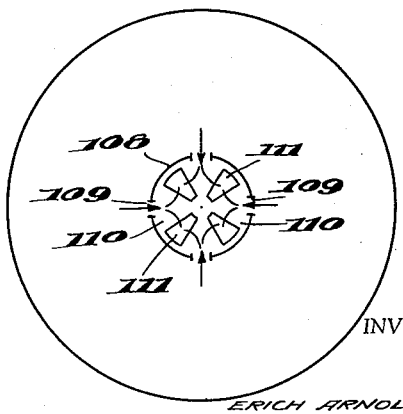

Figs. 1, 2, 3, 5, 6, 7 and 10 illustrate several embodiments of apparatus according to the invention in vertical cross sections. In Fig. 4, details of Fig. 3 are shown in perspective view. Fig. 8 shows a section on line A—A in Fig. 7, Fig. 9 a section on line B—B in Fig. 7, and Fig. 11 a section on line C—C in Fig. 10. Fig. 12 shows the application of the invention to an adsorber fitted with heat regenerator, and Fig. 13 to an adsorption column, in which the adsorption agent is successively charged with adsorbed substances, regenerated and dried while passing through the column in a circuit.

Fig. 1 shows in vertical cross section the lowest part of a continuously operated adsorption apparatus.

In this figure, 1 is the adsorber, which has in its lowest part a known discharging device not shown in the drawing. The gas is led into the adsorber at an appropriate place, such as 2. In the adsorber, a floor 3 is provided in which openings 4 are arranged. Below the openings lie the holding planes 5.

The passage of the adsorption media through the adsorber is regulated by means of device 6 consisting of bases 7 and 8, the latter being adjustable by means of the device 9. In the two bases, openings 10 and 11 are provided, adapted to overlap each other. Through the mechanism 9 the base 8 can be adjusted relative to the base 7 in such a way that the overlapping of the openings just permits the desired quantity of adsorption media to pass through. In the same degree to which the media flows through the openings 10 and 11, it passes from the adsorber through the openings 4, whereupon it is diverted by the baffle and deflector plates 5 and trickles over the edges of the latter. The pressure of the adsorption media filling the space above the level of the floor 3 is intercepted by the floor 3 and the plates 5. A small portion of the media tends to remain on the floor 3 lying in dead piles. To avoid these phenomena, guide plates are disposed on the floor 3, for example in the shape of roof like elements 12 shown in Fig. 1 in dotted lines. By this method, according to the invention, the vapour or gas flows through the openings 4 in countercurrent to the adsorption media.

In the device according to Fig. 2 the separation between chambers 13 and 14 consists of roof shaped guide plates 16 which converge and have outlets 15. The stowage plates 17 extend under and beyond the openings 15 so that the media trickles through the openings 15 and over the edge of the holding plates 17. On the right hand side of Fig. 2 the guide plates 16 are formed in louvred fashion, so that the travel of the gaseous media is separated from that of the adsorption media.

The treatment spaces 18 and 19 according to Figs. 3 and 4 are separated by the roofs 20 and between the lower ridges of the roofs, openings 22 are arranged through which the adsorption media moves downward that is the lower ridges of two contiguous roofs are connected by plates 21 and between the stays openings 22 are left free. At the lower ridges of the roofs vertical walls 23 are disposed and the spaces between two contiguous walls 23 and above the plates are covered by the roofs 24. In the walls 23 lie openings 25 offset with respect to the openings 22 between the plates. The adsorption media proceeds from the space 18 through the openings 25 to the plates 21 and from the plates through the openings 22 into the space 19. The passage of the gaseous media into the chamber 18, takes place in the opposite direction through the like openings 22 and 25.

Figure 5:
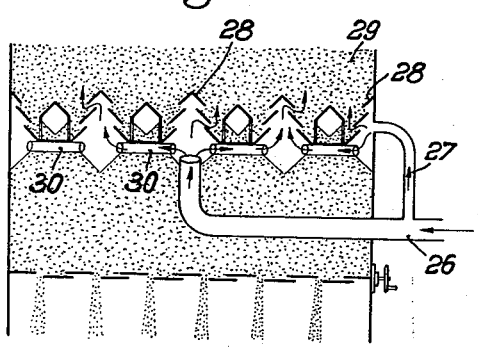

According to Fig. 5 which likewise illustrates a vertical section through part of the adsorber, the passage of the gaseous media is separate from that of the adsorption media. The gaseous media proceeds through pipes 26 and 27 into the spaces below the roofs 28 which are constructed in louvred form, and through the louvres into the chamber 29. For the distribution of the gaseous media under the separate roofs, channels 30 are provided. The means for the progress of the adsorption media from the chamber 29 are as illustrated in Figs. 3 and 4.

Figure 6:
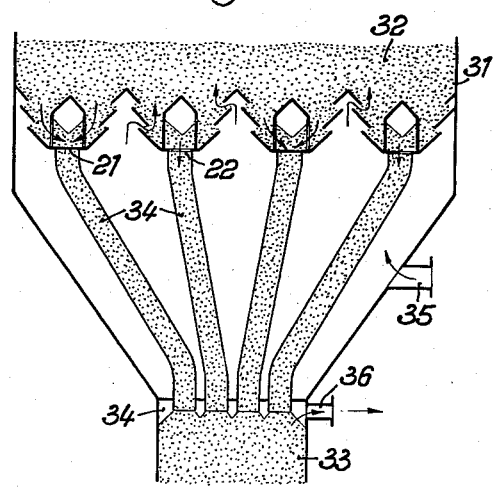
Figure 7:
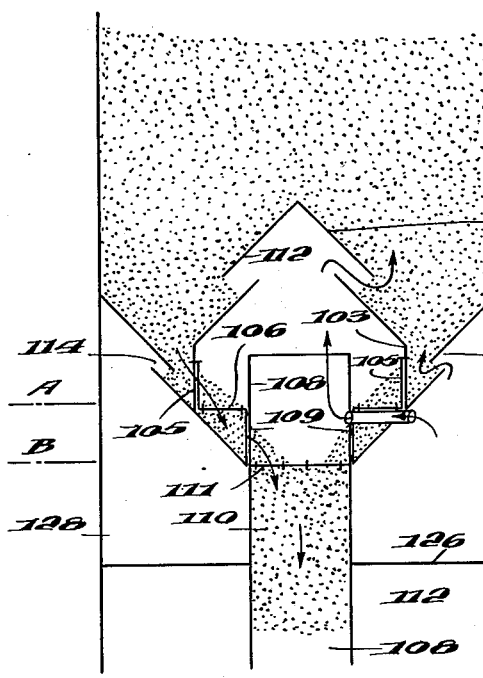

In the apparatus of Fig. 6 a zone 33 lies below the zone 32, the zones having a different cross section. The device for removal of adsorption medium from the zone 32 is the same as shown in Fig. 5, except that below the openings 22 channels or tubes are provided through which the adsorption media is uniformly introduced into the zone 33. The supply of gaseous media introduced at 35 passes upward through chamber 32, while another gaseous media introduced into zone 33 from below can escape through outlet 36. Between the lower ends of the pipes 34 which project into the zone 33 there is formed a collecting space for this gas.

In the apparatus of Fig. 6 a higher pressure can be maintained in the space below the roofs than in the zone 33 as the adsorption media in the pipes 34 offers a corresponding flow resistance which rises with the length of the pipes 34. Referring now to Figs. 7, 8 and 9, 101 is a portion of an adsorption column, e. g., an adsorber or desorber with circular cross section. In the lower part of the column 101 is a structure of louvred type with roofs 102 and a cylindrical under part 103, reaching downward to a conical floor 104. In the wall of the cylinder 103 openings 105 are provided in suitable numbers. Through the openings 105 the adsorption media comes on to the floor 106. In this floor openings 107 are arranged staggered relative to the openings 105, so that the adsorption media from the floor 106 flows through the openings 107 into the lower part of the cone-shaped floor 104. In the centre of the cone 104 is a pipe 108, the upper part of which extends inside the cone 104. In the walls of this part openings 109 are provided. The number of these openings is, for example, about one half to two thirds less than that of the openings 105. In the pipe 108, a floor 110 is provided below the openings 109, which like the floor 106, is provided with openings 111. The adsorption media flows through the openings 109, into the pipe 108, the openings 111 in the floor 110 and into the lower part of the pipe 108 which is steadily filled by the adsorption media. This is attained for example by means of a throttling device located in a suitable position on the adsorption column. The radius of the cylinder 103 advantageously is equal to the distance from the center of cylinder 101 to the center of gravity of a sector of cylinder 101 whose arc is $$\frac{360}{n}$$

degrees, where $n$ is the number of the openings 105. By making the radius of the cylinder 103 of this size, a particularly uniform downward movement of the adsorption media in the adsorption column is attained. Further, a good separation of the gaseous atmospheres in the upper part and the part 112 of the adsorption column is obtained, because it is now possible to pass from the larger cross section of the space 101 to the much smaller cross section of the pipe 108.

Instead of two series of guiding surfaces and holding surfaces, three or more series can be used, especially if it is of importance to transfer from the large cross section of the space 101 to a small one of the pipe 108 which latter has for example only about one fiftieth to one sixtieth of the size of the former.

The new apparatus has the further advantage that the introduction and distribution of the gas or the like into the adsorption media in chamber 101, can be accomplished very uniformly. This can be attained by providing the conical surfaces 102 and 104 with a suitable number of passage openings, for example slits 112 and 114 for the gas. The gas proceeds from a supply pipe 127 into that portion 128 of the column 101 which portion is bounded below by the floor 126. From the space 128 part of the gas passes through the slit 114 in the cone 104 into the adsorption media, while another part flows through the pipe 113 into the space under the cone 102 and through the slits 112 of this cone. If the adsorption media from the pipe 108 is to be distributed uniformly in a space lying thereunder, then below the pipe 108 distributing or holding planes will be provided in this space at suitable heights and in suitable number.

Figure 10:
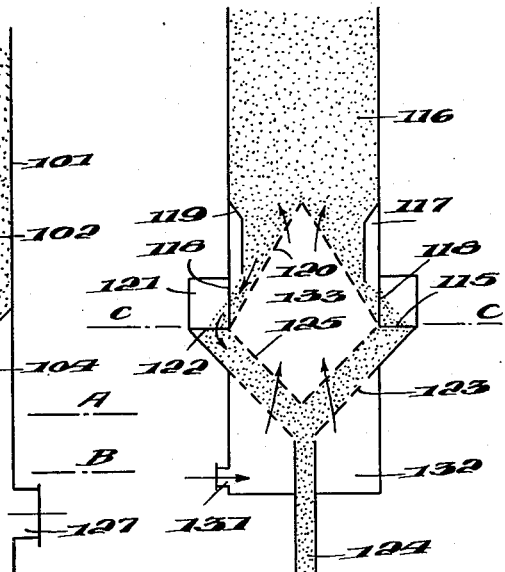
Figure 11:
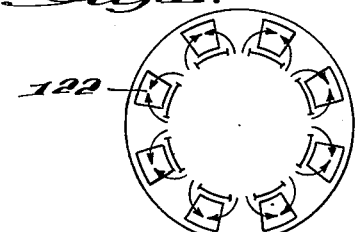

Good results with regard to an even downward movement of the adsorption media through the chambers of the adsorption apparatus, the avoidance of attrition owing to a careful treatment of the adsorption media, an advantageous gas feeding and gas distribution as well as the shutoff against each other of the atmospheres of two adjacent reaction chambers may also be achieved when applying this invention in the embodiment as represented by Figs. 10 and 11, by which the adsorption media is discharged near the walls of the reaction chamber.

Through the openings 118 arranged in wall 117 of the reaction chamber 116 round the circumference of the latter the adsorption media will proceed on to floor 115 which is provided with openings. The annular floor 115 surrounding the walls of the reaction chamber is shut off from the outside by a casing or the like 121. In reaction chamber 116 guiding planes 120 are provided in the form of a perforated or slatted cone. Further guiding planes may be arranged along the walls 117. These guiding planes 119 and 120 will serve for passing the adsorption media from all parts of the cross-section of chamber 116 in equal quantities on to floor 115. The openings 122 in floor 115 are arranged in staggered relation to the openings 118 in wall 117 so that the adsorption media getting through the openings 118 on to floor 115 changes direction on the latter before flowing on through the openings 122 into the conical outlet 123 and from there into pipe 124. An insertion 125 may be provided at a suitable distance above the outlet 123. Then the adsorption media may be guided in an unbroken flow of uniform strength between parts 123 and 125 into pipe 124.

The gaseous or vaporized media which is to be conducted through the adsorption media in chamber 116, enters chamber 132 by a supply pipe 131. The part of the chute 123 lying within chamber 132 and the insertion 125 are made permeable to gas so as to enable the gaseous media to pass in a uniform flow through the layer of adsorption media between 123 and 125 into chamber 133 and from there over the guiding planes 120 which are likewise permeable to gas into the adsorption media in chamber 116.

The annular floor 115 may also be arranged within the walls 117 of reaction chamber 116. In this case the guiding planes will reach down to the guiding planes 120, the openings 118 being arranged in the lowest part of guiding planes 119.

Referring to Fig. 12 below the adsorber 37 which contains the adsorption media 38, heat accumulating material 40 is placed on a perforated floor or base 41. The tubes 42 which join below the passage openings for the adsorption media, project through this perforated floor into the lower part 43, in which roof housings 44 are installed. During adsorption, the gas enters through the connection 45 and in contact with the heat accumulating material 40. On its way through this material it is warmed. Then it flows through the adsorption media freed of the products to be recovered and is drawn off at 46. If the adsorption media is sufficiently charged, it is steamed out for recovery of the adsorbed material. In steaming out, which alternates with the adsorption the steam entering the adsorber from above is led, through the adsorption media, and then through the heat accumulating material 40, in which it gives off a portion of its heat. Further the steam passes through the mass of the adsorption media in the lower portion 43 to the outlet 47 and is led off at 48.

In the event of a portion of the spent adsorption media being drawn off, the slide 49 is opened and the adsorption media flows downwards through the openings 50 which can be constructed as shown for example in Figs. 3 and 4. When the desired quantity has run out, the slide 49 can again be closed.

Fig. 13 shows in vertical section an arrangement for continuous adsorption processes, which can, for example, be used for the separation and simultaneous concentration of ethylene and ethane from coke oven gas. For example, coke oven gas containing 1.5% ethylene and 0.5% ethane (by volume) enters, at 55, through the contrivance 56 constructed in accordance with the invention, into the adsorption zone 57 and flows upward therein. Hereby the counter-flowing adsorption media is loaded with ethylene and ethane, and the gas, freed of these substances, leaves the adsorber through the pipe 58. Through the tubes 59 communicating with the contrivance 56, a uniform flow of the adsorption media from the adsorber 57 into the rectisorption column 60 of smaller cross section lying below is assured. Through the rectisorption column 60 the adsorption media proceeds into the desorber 61, which has a larger cross section than that of the column 60. In the apparatus 61, the adsorbed materials are driven out of the adsorption media, for example, by indirect heating and direct steaming. The ascending gases are separated into fractions in the rectisorption column. For this purpose the rectisorption column is subdivided by devices 62, 63, 64 and 65 which are constructed for example as shown in Figures 3 and 4. From these parts pipes 66, 67, 68 and 79 respectively branch off. Through the pipe 66 the heavier boiling substances are drawn off, at 67 a highly concentrated ethane, at 68 a highly concentrated ethylene at 69 lighter boiling materials, such as carbonic acid, and at 70 the residual gas, consisting of methane and other inert gases. Through the apparatus 62 to 65 a uniform downward flow of the adsorption media on the one hand, and an unhindered upward passage of the gaseous media on the other hand are ensured.

Beneath the desorber 61 is the apparatus 72, which is constructed as shown by example in Fig. 6 and into which the steam necessary for the desorption is led by a conduit 73. The regulation of the speed of passage of the adsorption media through the adsorption apparatus occurs by means of the slide 74 lying in the chute 75. The regenerated adsorption media is led to the chute 75 by tubes 76 which are connected to the devices 72. In the adsorber, known installations may be arranged for the drying and cooling of the adsorption media. The gas necessary for the feed is led back to the blower 80, through the pipe 79. From the chute 75 the adsorption media is brought again into the hopper 77 by the device 81, which communicates with the adsorber by the pipe 76.

The apparatus in accordance with the invention may be used advantageously also for other purposes than adsorption processes for example catalytic chemical reactions in which catalysts are to be conveyed continuously or intermittently through contact chambers. A very gentle treatment of the catalysts and a specially uniform contact of the catalysts with the gases are thus attained. These gases can in like manner, as already described, be run in direct or counter flow with the catalysts. For the conduction of the gases, the apparatus according to the invention may also be applied in synthetic processes where a uniform distribution of the gases in the catalyzer is also of great importance.

What we claim is:

1. In an apparatus for passing finely divided or granular material from a chamber into the space beneath it comprising a floor including a section having spaced openings therein, a roof section above said floor section, and at least one upstanding wall section having parts extending from the floor section to the roof section, said parts being located opposite substantially the whole width of each of said openings and said wall section having spaces therein between said parts, whereby the material flows through such spaces onto parts of the floor section between said openings and then through said openings into the space below said floor.

2. In an apparatus as claimed in claim 1, said floor including an upwardly inclined portion adjacent said floor section.

3. In an apparatus as claimed in claim 1, at least one downwardly extending pipe communicating with said openings.

4. In an apparatus as claimed in claim 3, said floor including an upwardly inclined portion adjacent said floor section.

5. An apparatus for passing finely divided or granular material from a chamber into the space beneath it comprising a floor including a plurality of elongated parallel sections each having spaced openings therealong, a roof section above each of said floor sections, and an upstanding wall section along each side of each such floor section having parts extending from the floor section to the roof section, said parts being located opposite substantially the whole width of each of said openings and said wall section having spaces therein between said parts, whereby the material flows through such spaces onto parts of the floor section between said openings and then through said openings into the space below said floor.

6. In apparatus as claimed in claim 5, said floor including upwardly convex sections extending between and parallel with said floor sections.

7. In apparatus as claimed in claim 5, said roof sections being upwardly convex.

8. In an apparatus for passing finely divided or granular material from a chamber into the space beneath it comprising a floor including a section having spaced openings arranged in a circle therein, a roof section above said floor section, and at least one upstanding circular wall section around said floor section having parts extending from the floor section to the roof section, said parts being located opposite substantially the whole width of each of said openings and said wall section having spaces therein between said parts, whereby the material flows through such spaces onto parts of the floor section between said openings and then through said openings into the space below said floor.

9. In an apparatus as claimed in claim 8, said roof section comprising an upwardly pointing cone.

10. In an apparatus as claimed in claim 8, a downwardly extending pipe beneath said floor section communicating with said openings.

11. In an apparatus as claimed in claim 8, a funnel beneath said floor section, and a downwardly extending pipe connected to said funnel.

12. In an apparatus for passing finely divided or granular material downwardly comprising a floor section having a plurality of openings therein, at least one wall section upstanding from said floor section and having parts opposite substantially the whole width of each of said openings and said wall section having spaces therein between said parts, and means preventing access of material to such floor section other than through such spaces, whereby the material flows through such spaces onto parts of the floor section between said openings and then through said openings into the space below said floor section.

13. In an apparatus as claimed in claim 8, a conical wall below said floor section openings, and a pipe leading from the space beneath said conical wall into the space beneath said roof section to permit flow of gas from beneath the conical wall to the space beneath the roof section without passing through the floor section openings.

14. In an apparatus for passing finely divided or granular material from a chamber into a space beneath it, a floor including a first section having first spaced openings arranged in a circle therein, a roof section above said floor section, a first upstanding circular wall section around said first floor section having parts extending from the first floor section to the roof section, said parts being located opposite substantially the whole width of each of said first openings and said first wall section having spaces therein between said parts, whereby the material flows through such spaces onto parts of the first floor section between said first openings and then through said first openings into the space below said floor, a second floor section at a lower level than said first floor section, a conical wall below said openings connecting said first and second floor sections, a second upstanding circular wall section extending downwardly from the first floor section to the second floor section on the side of the first openings laterally opposite from the first wall section, said second floor section having second spaced openings arranged in a circle therein, said second wall section having solid parts opposite substantally the whole width of each of said second openings and having spaces between said solid parts.

ERICH ARNOLD.
EDMUND HEILMANN.
WENDLIN VOLLMER.

References Cited in the file of this patent

UNITED STATES PATENTS

| Number | Name | Date |
|---|---|---|
| 1,702,311 | Pantenburg | Feb. 19, 1929 |
| 2,412,135 | Evans | Dec. 3, 1946 |
| 2,430,669 | Crowley | Nov. 11, 1947 |
| 2,438,261 | Utterback | Mar. 23, 1948 |
| 2,477,281 | Bergstrom | July 26, 1949 |
| 2,482,138 | Schutte | Sept. 20, 1949 |
| 2,526,701 | Shirk | Oct. 24, 1950 |
| 2,560,604 | Shabaker | July 17, 1951 |